(12) United States Patent
David et al.

(10) Patent No.: US 6,398,254 B2
(45) Date of Patent: Jun. 4, 2002

(54) AIRBAG ARRANGEMENT

(75) Inventors: Patrick David; Jochen Maidel, both of Ulm (DE)

(73) Assignee: Takata (Europe) Vehicle Safety Technology GmbH, Ulm (DE)

(*) Notice: Subject to any disclaimer, the term of this patent is extended or adjusted under 35 U.S.C. 154(b) by 0 days.

(21) Appl. No.: 09/858,952

(22) Filed: May 17, 2001

(30) Foreign Application Priority Data

May 17, 2000 (DE) .......................................... 100 24 293

(51) Int. Cl.[7] .............................................. B60R 21/22
(52) U.S. Cl. ................................................... 280/730.2
(58) Field of Search ........................ 280/730.2, 730.1, 280/728.2, 729, 743.1, 732

(56) References Cited

U.S. PATENT DOCUMENTS

| 3,791,667 | A | * | 2/1974 | Haviland | .................. | 280/730.2 |
| 6,086,091 | A | * | 7/2000 | Heinz et al. | ............. | 280/730.2 |
| 6,113,135 | A | * | 9/2000 | Tsutsumi | .................. | 280/730.2 |

FOREIGN PATENT DOCUMENTS

| DE | 42 23 620 A1 | 1/1993 |
| DE | 296 04 892 U1 | 10/1996 |
| EP | 0 590 845 A1 | 4/1994 |
| JP | 10-119697 | * 5/1998 |

OTHER PUBLICATIONS

German Search Report, Mar. 26, 2001, German Application No. 100 24 293.6.

* cited by examiner

Primary Examiner—Peter C. English
(74) Attorney, Agent, or Firm—Foley & Lardner

(57) ABSTRACT

A vehicle has an airbag arrangement, which has an airbag module mounted to or integrated with the vehicle door. The module has a housing in which at least one inflatable airbag stored in the module in a folded state. The housing has an elongated outlet opening that extends substantially the entire length of the inflated airbag, and a support section that supports and braces the airbag, in the inflated state, under pressure against the support section so that the airbag becomes self-supporting. The inner peripheral region of the outlet opening can form the support section. Alternatively, the inner peripheral region of an outlet opening formed in a door panel can form the support section. The self-supporting air bag is particularly applicable for a convertible or topless vehicle.

33 Claims, 2 Drawing Sheets

AIRBAG ARRANGEMENT

BACKGROUND

A side airbag arrangement for a vehicle for side protection typically includes an airbag module integrated into a vehicle door or its panel. The module has an airbag that inflates to protect the passenger's head and neck areas. In this respect, the inflated airbag needs to extend above a vehicle or door parapet line (i.e., the area where the window extends from the vehicle door). See for example, German patent publication DE 295 17 373 U1.

There is still a need to improve the protection capability, while making the construction as simple as possible. Moreover, there is a need to protect the vehicle occupant during a lateral rollover, particularly for convertible or roadster vehicles, which do not have a hardtop roof. The present invention addresses these needs.

SUMMARY OF THE INVENTION

The present invention relates to a side airbag arrangement for a motor vehicle, a side airbag module thereof, and a vehicle incorporating the present airbag arrangement or the airbag module. The vehicle can be a convertible, without a B-frame or a hardtop roof. The vehicle includes at least one door and a seat positioned adjacent to the door. The vehicle includes an airbag module integrated or attached to the vehicle door, such as a panel thereof. The present side airbag arrangement thus includes the airbag module positioned in the vehicle door.

The airbag module has an elongated outlet opening, a support section, and an inflatable airbag stored in the airbag module, in a folded state. In particular, the airbag module has a housing mountable or mounted to the vehicle door or its panel. The airbag is stored in the housing. The housing can have the elongated outlet opening through which the airbag exits as the airbag is inflated and the support section for supporting and bracing the airbag in the inflated state.

The outlet opening is dimensioned to extend substantially over the entire length of the airbag in the inflated state. The support section can exclusively support the airbag in the inflated state so that the airbag becomes self-supporting.

The support section can comprise a peripheral area of the outlet opening. Alternatively, the door panel can have a complementary outlet opening, and the support section can comprise at least a peripheral area of the complementary outlet opening.

The airbag can be substantially airtight to maintain pressure sufficient to protect the passenger, in the inflated state, for at least five seconds for a vehicle rollover protection.

The airbag in the inflated state can be dimensioned to extend over more than a half the length of a door. More preferably, the airbag can extend substantially over the entire length of the door (along the parapet line).

The module or the module housing has a base opposite the outlet opening. The airbag can be secured to the airbag module or the housing at one of the base and an inner periphery of the module or housing outlet opening. The airbag can be connected to the airbag module exclusively via the support section.

The airbag can further include an additional protection section that extends beneath a plane of a door parapet line for protecting a passenger's leg. The additional protection section can lie along an inner side the vehicle door, in the inflated state of the airbag, for protecting a passenger's knee.

The airbag can further include a substantially U-shaped reinforcement for limiting the inflation volume or its thickness.

BRIEF DESCRIPTION OF THE DRAWINGS

These and other features, aspects, and advantages of the present invention will become more apparent from the following description, appended claims, and accompanying exemplary embodiments shown in the drawings, which are briefly described below.

DETAILED DESCRIPTION

Figure 1:
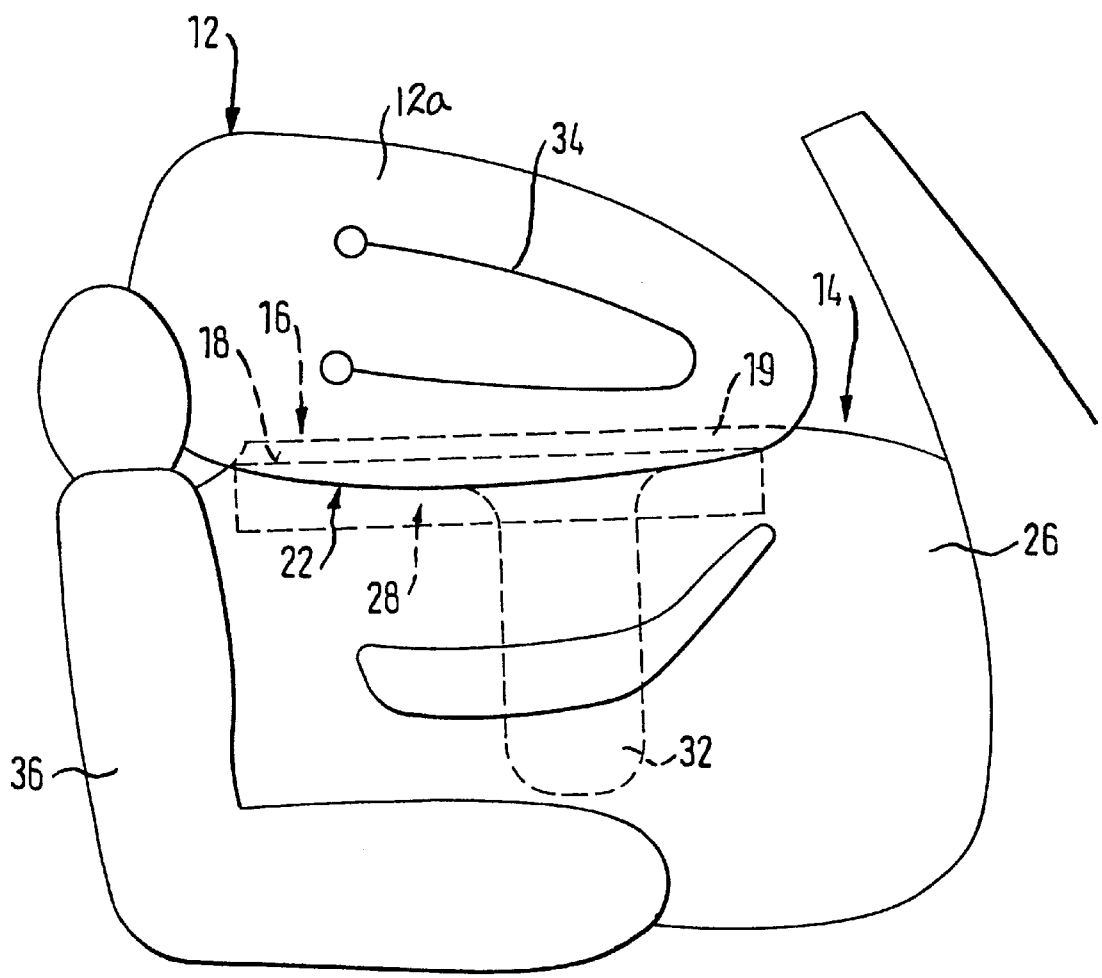
FIG. 1 schematically illustrates a side view of an embodiment of an airbag arrangement in accordance with the present invention.

Referring to FIG. 1, a vehicle (convertible or roadster shown, i.e., without a hardtop roof and B-column) has a door 14 and a seat 36 adjacent to it. An inner side of the door 14 has a lining or panel 26.

Figure 2A:
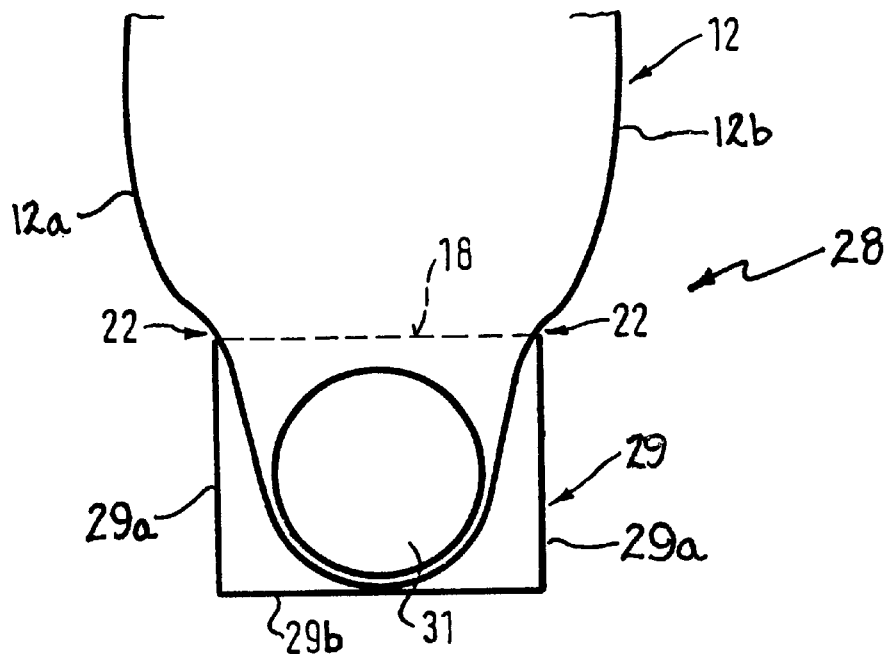
FIG. 2a schematically illustrates a sectional view of the airbag module in accordance with the present invention.
Figure 2B:
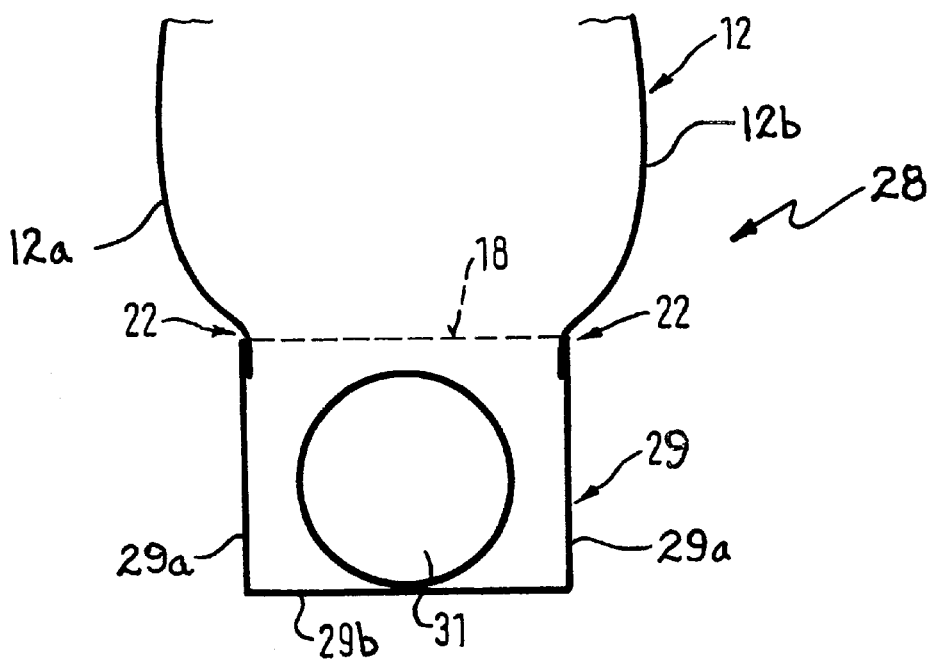
FIG. 2b is similar to FIG. 2a, but illustrates another embodiment of the airbag module, where the airbag is secured to the airbag module in a different manner.

The airbag arrangement includes an airbag module 28 (illustrated in phantom in FIG. 1), which has a folded airbag 12 and a gas generator 31 (see FIGS. 2a, 2b), arranged inside the door 14. The airbag shown in FIGS. 2a, 2b is in the inflated or deployed condition. The module 28 can be integrated or mounted to the door panel 26, which has an outlet opening 19 positioned adjacent to a vehicle or door parapet line 16, which typically coincides with the area where the door window (not illustrated) meets the door body. The door panel 26 includes a cover (not illustrated) that is removable, i.e., torn open or pivoted away by deploying the airbag 12. The cover can form a portion of an upper edge or side of the door panel 26, along the door parapet line 16.

Referring to FIGS. 2a and 2b, the airbag module 28 has a housing 29 having opposing walls or sidewalls 29a and a base 29b extending between them. The housing 29 has an elongated outlet opening 18 through which the gas generator 31 and the airbag 12 are inserted and stored therein. The length of the opening 18 is sized so that it extends substantially over the entire length of the inflated airbag 12. The length of the airbag 12 means its extent taken along (parallel to) the longitudinal axis of the vehicle. In this respect, the airbag 12 and the outlet opening 18 can extend substantially over the entire length of the vehicle door 14. Because the opening 18 covers substantially the entire length of the airbag, the airbag module 28 can stably brace the inflated airbag, as discussed below in detail.

In the folded or stored state, the airbag 12 is located inside the housing 29. The airbag 12 has a first side 12a that faces the seat 36 or the passenger seated therein and a second side 12b that faces the window or outside (if the widow is rolled down) in the inflated state of the airbag. In the inflated state, the airbag 12 is configured to cover at least above the door parapet line 16.

The airbag 12 can additionally have one or more column or tubular shaped protection sections 32 that extends, in the inflated state of the airbag, at least a region beneath the plane of the door parapet line 16. FIG. 1 illustrates an example of a vertically extending protection section 32 (shown in phantom). With the protection section 32, which deploys during the inflation of the airbag 12, an additional lateral protection cushion is present beneath the door parapet line 16. The size and position of the protection section 32 in principle can be chosen as desired, to provide an effective leg protection, particular a knee protection, for the respective vehicle passenger. The protection section 32, which extends beneath the door parapet line 16, furthermore can be positioned so that at least the head and throat protection area of the airbag 12, which is located above the door parapet line 16, is secured against pivoting out of the vehicle door plane. In other words, the protection section 32 acts as a support lever, via which the inflated airbag 12 can be braced laterally, i.e., at a door panel surface extending approximately parallel to the vehicle door 14.

The first and second sides 12a, 12b of the airbag 12, which are located above the door parapet line 16 in the inflated state, each can be provided with a reinforcement 34 for controlling the airbag volume or its inflated shape. In the illustrated embodiment, the reinforcement comprises a substantially U-shaped reinforcement 34, which can comprise an airbag fabric folded and sewn together along the U-shape extending substantially parallel to the vehicle door 14, in the inflated state of the airbag. The reinforcement is designed to limit the inflation volume of the airbag 12 to control the expansion of the inflated airbag 12 in the direction transverse to the longitudinal axis of the vehicle, i.e., to control the thickness of the airbag 12. With the reinforcement 34, the airbag in the inflated state can achieve a particular shape, such as akin to a mattress-shape.

The outlet opening 19 in the panel 26 for the airbag 12 can be positioned substantially along or adjacent to the door parapet line 16. The opening 19 corresponds to the shape and size of the outlet opening 18 of the airbag module 28 and is aligned therewith. The outlet openings 18, 19, however, need not have exactly the same shape and size, and need not be exactly aligned with respect to one another. In relation to the outlet opening 18 of the airbag module 28, the outlet opening 19 is configured so that it does not impair the deployment of the airbag 12.

The periphery of the airbag module 28 that defines the outlet opening 18 has a closed peripheral contour that forms a support section 22 for supporting and bracing the inflated airbag 12. The airbag arrangement is configured so that, when the airbag 12 is deployed, the airbag 12 is pressed, via the gas pressure in the airbag 12, against the support section 22 and is thus braced at the support section 22, i.e., becomes self-supporting.

The support section 22 also can be formed by the periphery of the door panel 26 that defines the outlet opening 19 having the substantially same configuration as the outlet opening 18 of the airbag module 28. In this respect, the airbag 12 itself can be secured to the door panel 26. In this case, the airbag module 28 can be sealed against the region that bounds the outlet opening 19.

The airbag 12, in the inflated state, braced against the support section 22, is stably positioned above the door parapet line 16, to provide a large lateral head-protection area for the respective vehicle passenger. The airbag 12 can be substantially airtight to maintain pressure sufficient to protect in the inflated state, for a sufficient duration for a vehicle rollover situation. A protection time of at least approximately five seconds can provide sufficient protection time in a vehicle rollover situation.

The airbag can be connected to the vehicle door or the airbag module, exclusively via the support section 22. Additional apparatuses for connecting the airbag to the vehicle door or to the airbag module are thus eliminated. The bracing of the airbag 12 using pressure against the support section is sufficient for a stable positioning of the airbag.

The airbag 12 can be secured at the airbag module 28 in several ways, as illustrated in FIGS. 2a and 2b, for example. FIG. 2a schematically shows the airbag module 28 without the vehicle door and without the door panel 26. The module housing 29 can have a U-shaped cross-section, i.e., the opposing sides 29a joined with the base 29b. In this embodiment, the airbag 12 is secured in the region of the module base 29b and the gas generator is located within the airbag. The airbag 12 can be secured to the module base 29b using any conventional means. The airbag 12 thus can easily be made airtight. Since the gas generator 31 is housed inside the airbag 12, the module housing 29 need not be airtight. FIG. 2b illustrates an alternative way of securing the airbag 12 to the module housing 29. Here, the airbag is secured around an inner periphery of the outlet opening 18 of the airbag module 28. In this instance, the module housing 29 needs to be airtight since the airbag is open on the housing side.

In both embodiments of FIGS. 2a and 2b, the peripheral outlet opening area of the airbag module 28 forms the support section 22 for the inflated airbag 12 on which the inflated airbag 12 can be braced. Thus, the airbag 12 in the inflated state is pressed into the support section 22 of the module 28, around the outlet opening 18 to provide a self-supporting airbag 12. Similar configuration can be formed by connecting the airbag 12 to the outlet opening 19 of the door panel 26, using that area as the support section 22.

According to the present invention, through bracing or supporting in a self-supporting manner of the airbag via the support section 22, which has at least approximately the dimensions of the outlet opening 18, a stable positioning of the inflated airbag is ensured. Because the airbag 12 is braced at the support section 22, using pressure, over a substantial portion of the airbag length, the airbag 12 is firmly held in a stable protection position. Accordingly, no further supports, such as, for example, a roof frame or B-column, is required to stably maintain the inflated airbag in position. The airbag arrangement according to the present invention is therefore particularly suitable for convertibles and roadsters.

The airbag arrangement according to the present invention through pressing the airbag 12 into the support section 22 allows a large protection surface that can extend substantially along the entire vehicle door and thus provide a lateral protection cushion for the head and neck areas of the respective vehicle passenger.

The airbag arrangement also provides protection against a vehicle rollover. Furthermore, the airbag 12 of the present airbag arrangement can be matched with a thorax airbag, which can be either separate or associated with the present airbag arrangement.

A further advantage of the present invention is that the bracing of the airbag 12 enables short and direct deployment path, through which the deployment of the airbag need not take place aggressively during its inflation.

Given the disclosure of the present invention, one versed in the art would appreciate that there may be other embodiments and modifications within the scope and spirit of the present invention. Accordingly, all modifications attainable by one versed in the art from the present disclosure within the scope and spirit of the present invention are to be included as further embodiments of the present invention. The scope of the present invention accordingly is to be defined as set forth in the appended claims.

We claim:

1. A side airbag arrangement for a motor vehicle, comprising:
   an airbag module integrated with a door of the vehicle, the airbag module having an elongated outlet opening and a support section; and
   an inflatable airbag stored in the airbag module, in a folded state,
   wherein the outlet opening is dimensioned to extend substantially over the entire length of the airbag, in an inflated state thereof, through which the airbag exits the airbag module as the airbag inflates,
   wherein the support section exclusively braces the airbag in the inflated state so that the airbag becomes self-supporting.

2. A side airbag arrangement according to claim 1, wherein the support section comprises a peripheral area of the outlet opening.

3. A side airbag arrangement according to claim 1, wherein the door has a door panel that has a complementary outlet opening and the support section comprises at least a peripheral area of the complementary outlet opening.

4. A side airbag arrangement according to claim 1, wherein the airbag is substantially airtight to maintain pressure sufficient to protect a passenger, in the inflated state, for at least five seconds for a vehicle rollover protection.

5. A side airbag arrangement according to claim 1, wherein the airbag in the inflated state is dimensioned to extend over more than a half the length of the door.

6. A side airbag arrangement according to claim 5, wherein the airbag in the inflated state is dimensioned to extend substantially over the entire length of the door.

7. A side airbag arrangement according to claim 1, wherein the airbag module has a base opposite the outlet opening, the airbag being secured to the airbag module at one of the base and an inner periphery of the outlet opening.

8. A side airbag arrangement according to claim 1, wherein the airbag is connected to the airbag module exclusively via the support section.

9. A side airbag arrangement according to claim 1, wherein the airbag further includes an additional protection section that extends beneath a plane of a door parapet line for protecting a passenger's leg.

10. A side airbag arrangement according to claim 9, wherein the additional protection section lies along an inner side of the vehicle door, in the inflated state of the airbag, for protecting a passenger's knee.

11. A side airbag arrangement according to claim 1, wherein the airbag has a substantially U-shaped reinforcement for limiting the inflation volume.

12. A side airbag module for a vehicle door, comprising:
   an airbag housing adapted for mounting to the vehicle door; and
   an inflatable airbag stored in the airbag housing, in a folded state;
   wherein the airbag housing has an elongated outlet opening through which the airbag exits as the airbag is inflated and a support section for supporting and bracing the airbag in an inflated state,
   wherein the outlet opening is dimensioned to extend substantially over the entire length of the airbag in the inflated state,
   wherein the support section exclusively supports the airbag in the inflated state so that the airbag becomes self-supporting.

13. A side airbag module according to claim 12, wherein the support section comprises a peripheral area of the outlet opening.

14. A side airbag module according to claim 12, wherein the airbag or airbag with the housing is substantially airtight to maintain pressure sufficient to protect a passenger, in the inflated state, for at least five seconds for a vehicle rollover protection.

15. A side airbag module according to claim 12, wherein the airbag in the inflated state is dimensioned to extend over more than a half the length of the door.

16. A side airbag module according to claim 15, wherein the airbag in the inflated state is dimensioned to extend substantially over the entire length of the door.

17. A side airbag module according to claim 12, wherein the housing has a base opposite the outlet opening, the airbag being secured to the airbag module at one of the base and an inner periphery of the outlet opening.

18. A side airbag module according to claim 12, wherein the airbag is connected to the airbag module exclusively via the support section.

19. A side airbag module according to claim 12, wherein the airbag further includes an additional protection section that is adapted to extend beneath a plane of a door parapet line for protecting a passenger's leg.

20. A side airbag module according to claim 19, wherein the additional protection section is adapted to lie along an inner side of the vehicle door, in the inflated state of the airbag, for protecting a passenger's knee.

21. A side airbag module according to claim 12, wherein the airbag has a substantially U-shaped reinforcement for limiting the inflation volume.

22. A vehicle comprising:
   at least one door;
   a seat positioned adjacent to the door;
   a side airbag module comprising;
      an airbag housing mounted to the vehicle door; and
      an inflatable airbag stored in the airbag housing, in a folded state,
      wherein the airbag housing has an elongated outlet opening through which the airbag exits as the airbag is inflated and a support section for supporting and bracing the airbag in an inflated state thereof,
   wherein the outlet opening is dimensioned to extend substantially over the entire length of the airbag in the inflated state thereof, and
   wherein the support section exclusively supports the airbag in the inflated state so that the airbag becomes self-supporting.

23. A vehicle according to claim 22, wherein the support section comprises a peripheral area of the outlet opening.

24. A vehicle according to claim 22, wherein the door has a door panel that has a complementary outlet opening, and the support section comprises at least a peripheral area of the complementary outlet opening.

25. A vehicle according to claim 22, wherein the airbag or the airbag and the housing is substantially airtight to maintain pressure sufficient to protect a passenger, in the inflated state, for at least five seconds for a vehicle rollover protection.

26. A vehicle according to claim 22, wherein the airbag in the inflated state extends over more than a half the length of the door.

27. A vehicle according to claim 26, wherein the airbag in the inflated state extends substantially over the entire length of the door.

28. A vehicle according to claim 22, wherein the airbag module has a base opposite the outlet opening, the airbag being secured to the airbag module at one of the base and an inner periphery of the outlet opening.

29. A vehicle according to claim 22, wherein the airbag is connected to the airbag module exclusively via the support section.

30. A vehicle according to claim 22, wherein the airbag further includes an additional protection section that extends beneath a plane of a door parapet line for protecting a passenger's leg.

31. A vehicle according to claim 30, wherein the additional protection section lies along an inner side of the vehicle door, in the inflated state of the airbag, for protecting a passenger's knee.

32. A vehicle according to claim 22, wherein the airbag has a substantially U-shaped reinforcement for limiting the inflation volume.

33. A vehicle according to claim 22, wherein the vehicle is convertible, without a B-frame.

* * * * *